(12) United States Patent
Chen et al.

(10) Patent No.: US 9,904,600 B2
(45) Date of Patent: Feb. 27, 2018

(54) GENERATING INITIAL COPY IN REPLICATION INITIALIZATION

(71) Applicant: International Business Machines Corporation, Armonk, NY (US)

(72) Inventors: Ye Chen, Shanghai (CN); Ruo Meng Hao, Shanghai (CN); Ke Zhao Li, Shanghai (CN); Shu Xi Wei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/818,406

(22) Filed: Aug. 5, 2015

(65) Prior Publication Data

US 2016/0062661 A1    Mar. 3, 2016

(30) Foreign Application Priority Data

Aug. 28, 2014  (CN) .......................... 2014 1 0433437

(51) Int. Cl.
*G06F 3/06* (2006.01)
*G06F 11/14* (2006.01)
*G06F 11/20* (2006.01)

(52) U.S. Cl.
CPC ...... *G06F 11/1446* (2013.01); *G06F 11/1451* (2013.01); *G06F 11/2094* (2013.01); *G06F 2201/835* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,947,981 B2 | 9/2005 | Lubbers et al. | |
| 7,747,576 B2 | 6/2010 | Micka | |
| 7,809,691 B1* | 10/2010 | Karmarkar | G06F 11/1469 707/674 |
| 7,984,016 B2 | 7/2011 | Kisley | |
| 8,060,714 B1 | 11/2011 | Natanzon | |
| 8,135,930 B1 | 3/2012 | Mattox et al. | |
| 8,307,178 B2 | 11/2012 | Maki et al. | |
| 9,378,262 B2 | 6/2016 | Braddy | |
| 2007/0027936 A1 | 2/2007 | Stakutis et al. | |
| 2007/0185938 A1* | 8/2007 | Prahlad | G06F 17/30212 |
| 2012/0059986 A1* | 3/2012 | Kamiura | G06F 11/1456 711/112 |
| 2013/0054523 A1 | 2/2013 | Anglin et al. | |

FOREIGN PATENT DOCUMENTS

WO  WO2014/014580 A1  1/2014

* cited by examiner

*Primary Examiner* — Ryan Bertram
*Assistant Examiner* — Tracy Chan
(74) *Attorney, Agent, or Firm* — Francis Lammes; Stephen J. Walder, Jr.; David Zwick

(57) ABSTRACT

The present invention provides a mechanism for generating an initial copy in replication initialization. A request is received to replicate a source volume from a source node to a target node so as to generate the initial copy of the source volume in the target node. With respect to a current source data block of at least one source data block contained in the source volume, a search in the target node is performed for a target data block corresponding to the current source data block. Responsive to identifying the target data block, the initial copy of the source volume in the target node is updated using the target data block with the information from the current source data block.

20 Claims, 9 Drawing Sheets

GENERATING INITIAL COPY IN REPLICATION INITIALIZATION

BACKGROUND

Various embodiments of the present invention relate to data replication, and more specifically, to a method and apparatus for generating an initial copy in replication initialization.

With the development of data storage technology and network communication technology, the concept of distributed data storage has been put forward so far. In distributed data storage, data is no longer located in one single data node but may be distributed across a plurality of data nodes at the same or different physical locations. Further, in order to provide more reliable data storage, a plurality of data copies of a data object may be stored in a plurality of data nodes in a distributed data storage system, so that when parts of data nodes fail, data in faulty nodes may be recovered on the basis of copies in other non-faulty data nodes.

Nowadays, the data amount in a database gets increasingly large with the increase of user demands. It might take several hours and even several days to replicate data among various data nodes in distributed data storage (for example, replicating data from a data node in Beijing to a data node in Shanghai). Although the efficiency of data replication may be increased by increasing the bandwidth between various data nodes, it takes huge overheads of manpower and material resources to increase the data bandwidth. In addition, since the data transmission amount between various data nodes is not stable, a large waste of bandwidth resources will be caused if the network transmission bandwidth is set on the basis of peak demand for the data transmission amount.

Replication initialization refers to a step of synchronizing data between different data nodes for the first time, during which all data in a source node needs to be copied to a target node. In the field of data replication, usually a large data transmission amount is required during replication initialization, while where there is an initial copy in the target node, only a small amount of data transmission can ensure the synchronization between the target node and the source node. Therefore, it becomes a research hotspot in the data replication field regarding how to increase the efficiency of initialization and rapidly generate an initial copy during replication initialization.

SUMMARY

Therefore, it is desired to develop a technical solution capable of conveniently and rapidly generating an initial copy in replication initialization. It is desired the technical solution may reuse as much as possible a data block that already exists in a target node, and generate in the target node an initial copy of a to-be-replicated source volume in a source node on the basis of the data block and/or other data block in the source data block.

In one illustrative embodiment, a method is provided for generating an initial copy in replication initialization. The illustrative embodiment receives a request to replicate a source volume from a source node to a target node so as to generate the initial copy of the source volume. With respect to a current source data block of at least one source data block contained in the source volume, the illustrative embodiment searches in the target node for a target data block corresponding to the current source data block and, responsive to identifying the target data block, the illustrative embodiment updates the initial copy of the source volume in the target node using the target data block with the information from the current source data block.

In other illustrative embodiments, In one embodiment of the present invention, there is provided an apparatus is. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In yet another illustrative embodiment, a computer program product comprising a computer useable or readable medium having a computer readable program is provided. The computer readable program, when executed on a computing device, causes the computing device to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
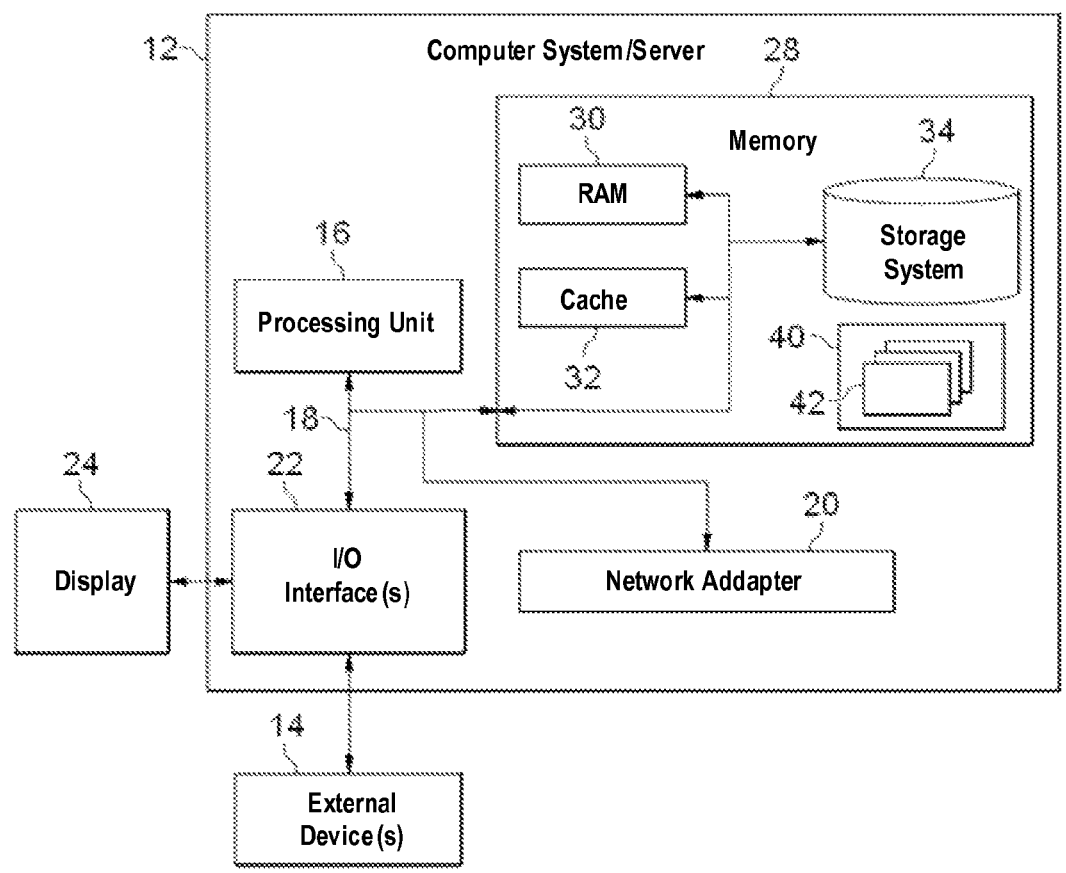
FIG. 1 schematically depicts a block diagram of an exemplary computer system/server which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
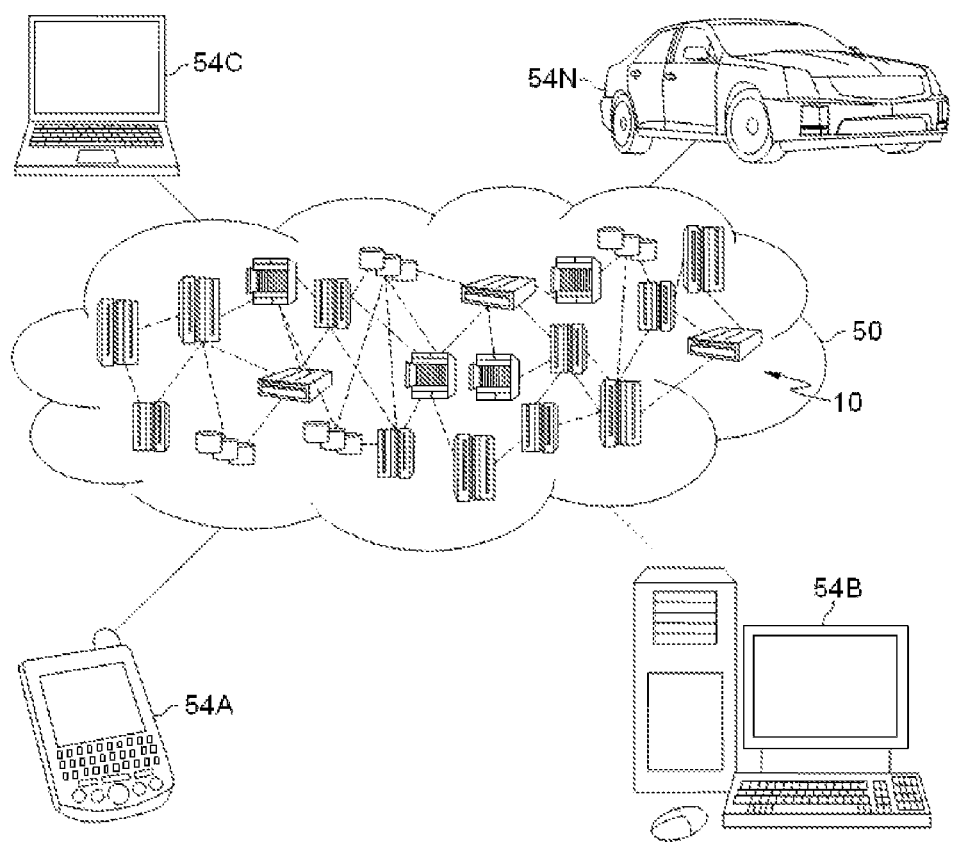
FIG. 2 schematically depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers may communicate. The local computing devices may be, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
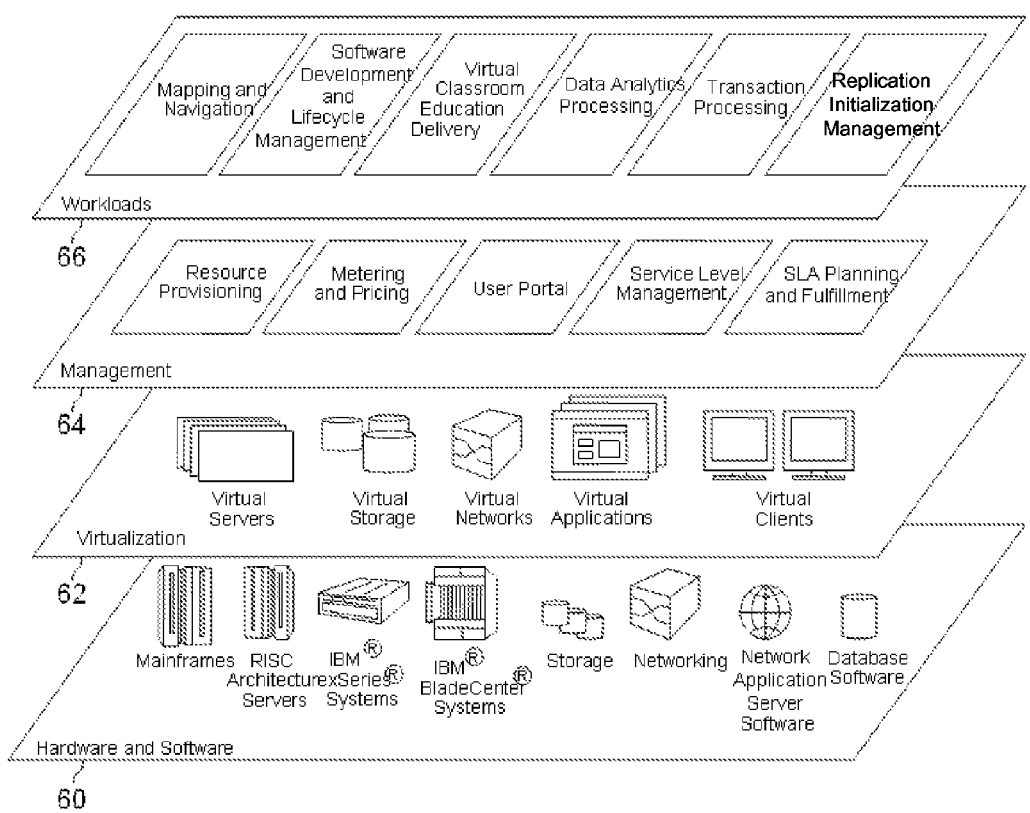
FIG. 3 schematically depicts a set of functional abstraction layers provided by cloud computing environment 50 (FIG. 2)

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes (e.g. IBM® zSeries® systems): RISC (Reduced Instruction Set Computer) architecture based servers (e.g., IBM pSeries® systems); IBM xSeries® systems; IBM BladeCenter® systems; storage devices; networks and networking components. Examples of software components include network application server software (e.g., IBM WebSphere® application server software); and database software (e.g., IBM DB2® database software). (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and replication initialization management.

In one embodiment of the present invention, the technical solution for generating an initial copy in replication initialization according to various embodiments of the present invention may be implemented at workloads layer 66, so as to rapidly generate an initial copy in replication initialization in a cloud computing environment. An application environment of the present invention has been illustrated above. Those skilled in the art should understand that the embodiments of the present invention may further be implemented in any other type of application environment that is known currently or to be developed later.

In distributed data storage, data nodes at a plurality of geographic locations may save a plurality of copies of the same data. In a distributed data storage system, there often exists the following circumstance: data in a second data node was once synchronized with data in a first data node, and later the administrator applies the second data node for other usage. After a period of time, data in the first data node is no longer kept synchronized with data in the second data node. If the administrator wants data in the first data node to be synchronized with data in the second data node again, then all data in the first data node needs to be re-copied to the second data node, and such a copy operation might last a couple of days.

For another example, when the second data node fails and thus stops working, data in the first data node might be updated. When the second data node is recovered and thus works again, since data in the first data node is updated while data in the second data node is corrupted, data in the first data node is no longer consistent with data in the second data node. At this point, to ensure the consistency between data in the two data nodes, all data in the first data node has to be re-copied to the second data node.

Two typical application environments have been illustrated above, wherein data in the source node and the target node was once synchronized but no longer kept synchronized for some reason (e.g., network fault, node fault or human decision). At this point, if copies of the same data object need to be saved in two data nodes, then the data object needs to be copied from one data node to the other in its entirety.

When the target node does not contain any data block in the source node (for example, is blank), all data blocks in the source node need to be copied to the target node. However, in most cases the target node has already stored some data blocks from the source node.

Figure 4A:
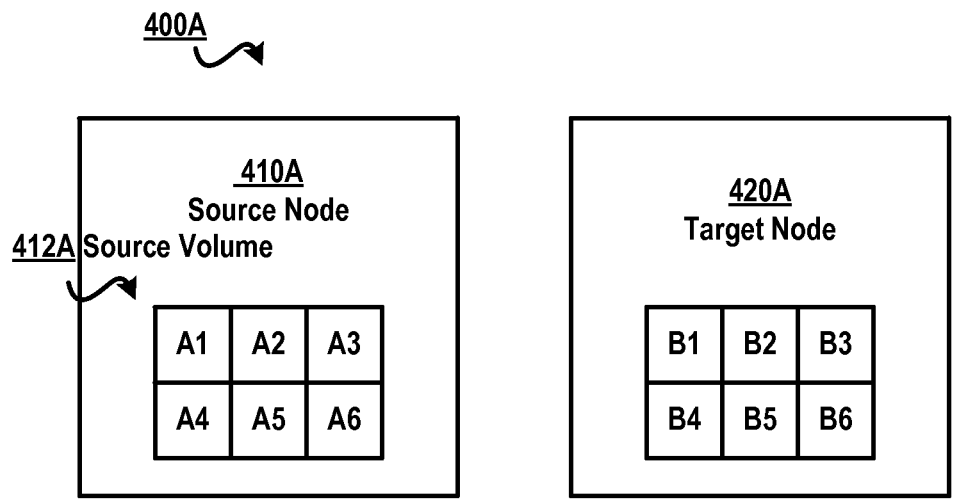
FIGS. 4A and 4B schematically depict diagrams of technical solutions for generating an initial copy in replication initialization according to one technical solution.
Figure 4B:
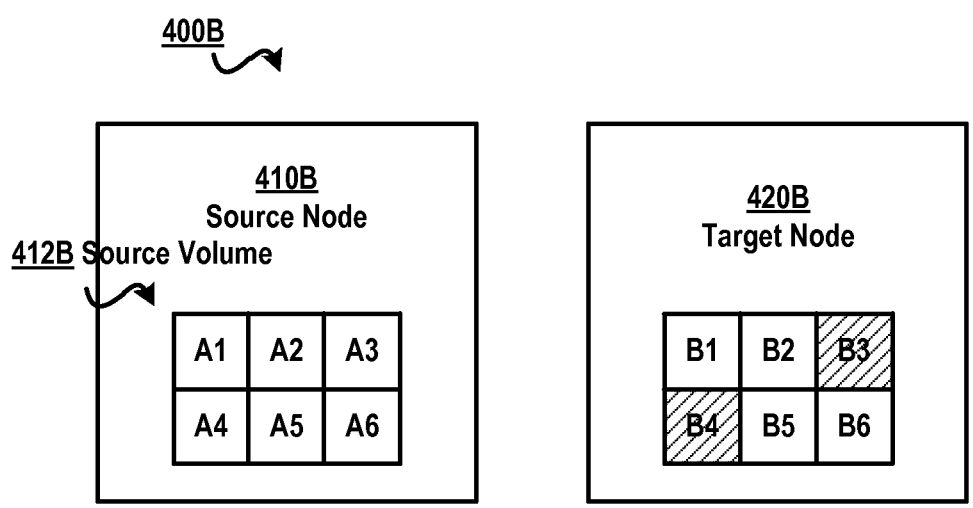

FIGS. 4A to 4B schematically show diagrams 400A and 400B of a technical solution for generating an initial copy in replication initialization according to one technical solution. FIG. 4A shows status 400A where a source node 410A and a target node 420A are kept synchronized, at which point data blocks A1 to A6 in a source volume 412A in source node 410A are copied to target node 420A to form an initial copy of source volume 412A (the initial copy comprises data blocks B1 to B6 respectively corresponding to source data blocks A1 to A6 in source volume 412A).

FIG. 4B schematically shows status 400B where a source 410B and a target node 420B are no longer synchronized after a period of time. As shown in FIG. 4B, data blocks B3 and B4 shown in shadow represent data blocks which are corrupted/modified and no longer correspond to data blocks A3 and A4; data blocks B1, B2, B5 and B6 shown in common boxes are data block which still correspond to data blocks A1, A2, A5 and A6 in source node 410B. According to a solution of the prior art, although in target node 420B there are data blocks corresponding to at least one part of data blocks in source volume 412B in target node 410B, an address relationship (address offset) between various data blocks in target node 420B might be no longer accurate. Therefore, all data blocks A1 to A6 in source volume 412B have to be re-copied from source node 410B to target node 420B during replication initialization.

In view of the above drawbacks in the prior art, it is desired to develop a technical solution capable of taking into full consideration a correspondence relationship between data blocks in a target node and a source node, and it is desired the technical solution can generate an initial copy of a source volume in the source node by making as much use of data blocks in the target node as possible. Thereby, the data transmission amount between the source node and the target node can be reduced, and further the time overhead of replication initialization decreased.

Those skilled in the art should understand that details of the embodiments of the present invention are described by taking volumes and data blocks as exemplary data storage cells throughout the context of the present invention. Those skilled in the art should understand that in data nodes implemented on the basis of different principles, data blocks may be embodied as different basic storage units. For example, in the data node implemented on the basis of a disk, the data block may be embodied as a track in the disk.

In one embodiment of the present invention, there is provided a method for generating an initial copy in replication initialization, comprising: receiving a request to replicate a source volume from a source node to a target node so as to generate the initial copy of the source volume; with respect to a current source data block in at least one source data block contained in the source volume, searching in the target node for a target data block corresponding to the current source data block; and using the target data block to update the initial copy.

Figure 5A:
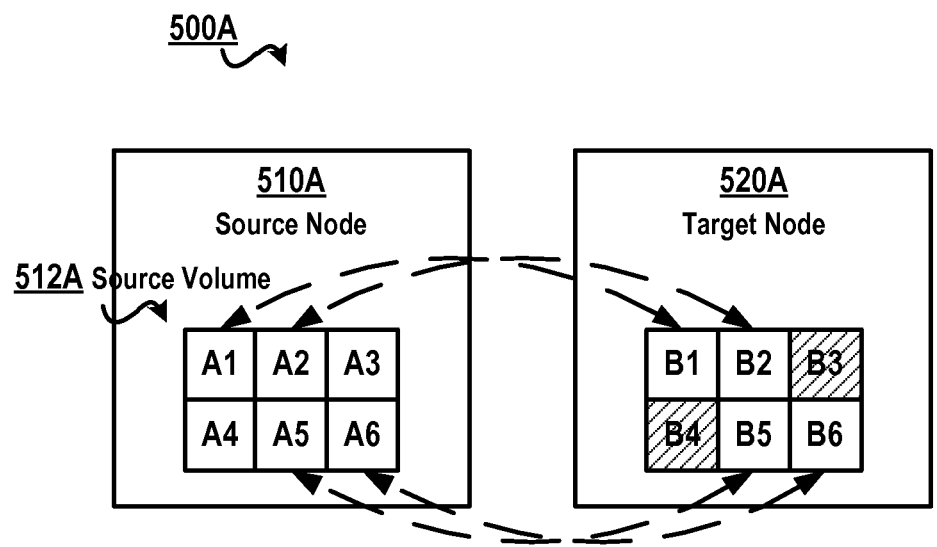
FIGS. 5A and 5B schematically depict diagrams of technical solutions for generating an initial copy in data initialization according to the embodiments of the present invention.
Figure 5B:
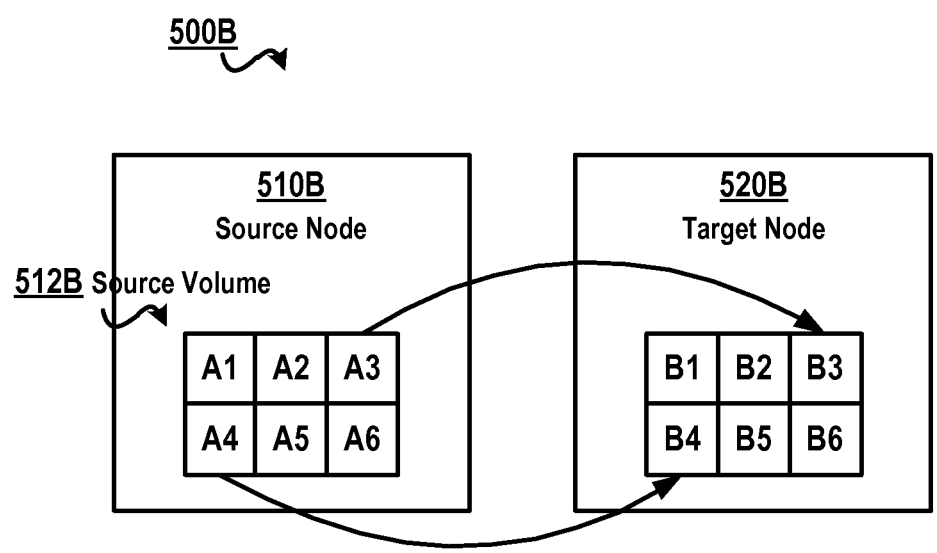

FIGS. 5A to 5B schematically show diagrams of technical solutions for generating an initial copy in data initialization according to the embodiments of the present invention. Specifically, FIG. 5A schematically shows a diagram 500A of a technical solution for generating an initial copy in replication initialization. As shown in this figure, a target node 520A and a source node 510A were once synchronized, but later the synchronization operation stopped and target node 520A was applied for other usage. If it is desired to synchronize target node 520A with source node 510A again, data blocks in target node 520A are as shown by data blocks B1 to B6. In FIG. 5A, data blocks B3 and B4 shown in shadow might be corrupted or modified, while data in data blocks B1, B2, B5 and B6 shown in common boxes are kept synchronized with data blocks A1, A2, A5 and A6 in a source volume 512A, respectively.

In one embodiment of the present invention, with respect to each source data block contained in source volume 512A (for example, any one of data blocks A1 to A6), a target data block corresponding to the data block may be found in target node 520A, for example, data block B1 corresponding to source data block A1 is found. At this point, the initial copy may be updated on the basis of the found target data block.

Specifically, suppose the initial copy is blank initially. By searching in target node 520A target data blocks corresponding to source data blocks A1 to A6, a correspondence relationship between source data blocks and target data blocks can be found (as shown by dashed arrows in FIG. 5A), and afterwards the initial copy may be updated on the basis of found target data blocks. For example, the updated initial copy may comprise target data blocks B1, B2, B5 and B6.

According to principles of the embodiments of the present invention, the final initial copy may be generated step by step. FIG. 5B schematically shows a block diagram 500B of a technical solution for generating an initial copy in replication initialization according to one embodiment of the present invention. On the basis of the initial copy (comprising target data blocks B1, B2, B5 and B6) generated according to the technical solution shown in FIG. 5A, other source data blocks in source volume 512B of source node 510B which do not exist in target node 520B may be copied to the initial copy (for example, source data blocks A3 and A4 are copied to target node 520B as shown by arrows in FIG. 5B) so as to generate a complete initial copy (comprising target data blocks B1 to B6 corresponding to source data blocks A1 to A6 respectively).

It is appreciated that, after the synchronization, an address relationship between target data blocks B1 to B6 in target node 520A is consistent with an address relationship between source data blocks A1 to A6 in source node 510A. Those skilled in the art should understand after a large amount of data updating operations are performed in target node 520A, although data blocks B1 to B6 still exist in target node 520A, these data blocks B1 to B6 might be scattered in target node 520A and relative address offsets between various data blocks might be changed.

Figure 6:
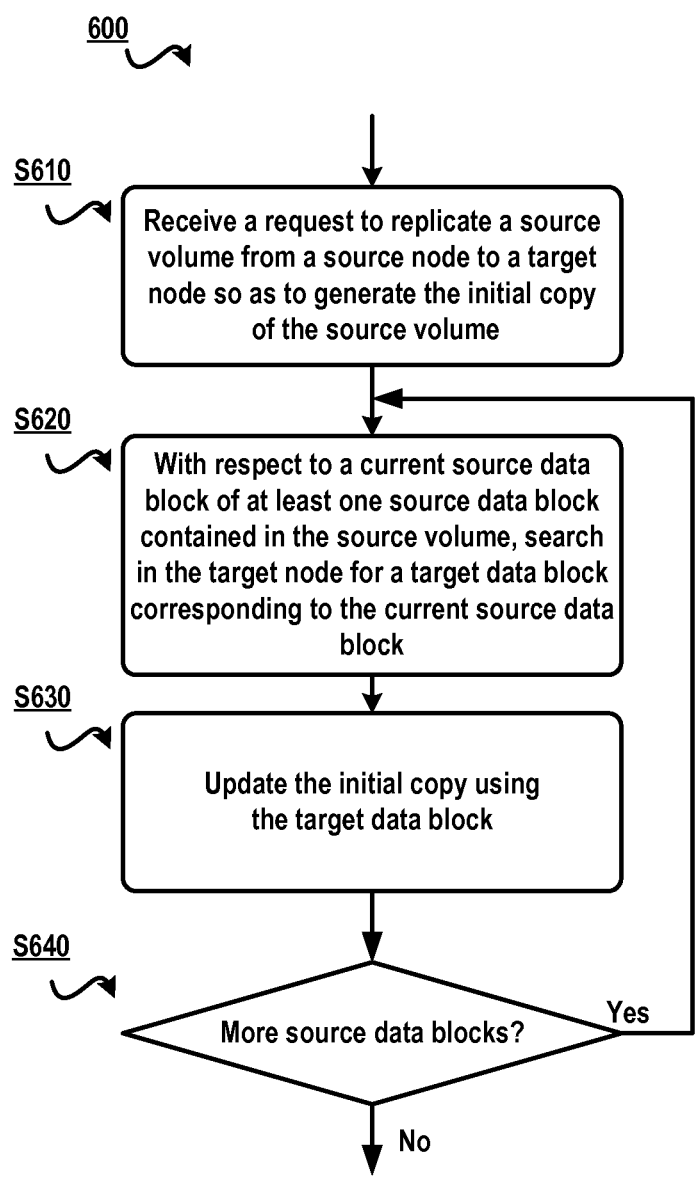
FIG. 6 schematically depicts a flowchart of a method for generating an initial copy in data initialization according to one embodiment of the present invention.

With reference to the figures, description is presented to concrete details of the embodiments of the present invention. FIG. 6 schematically shows a flowchart 600 of a method for generating an initial copy in data initialization according to one embodiment of the present invention. In step S610, a request to replicate a source volume from a source node to a target node so as to generate the initial copy of the source volume is received. In the context of the present invention, the volume, source node and target node are taken as examples to illustrate the principle of the technical solution for how to generate an initial copy of the volume in the target node. Those skilled in the art should understand that in a specific application, multiple volumes perhaps need to be copied from multiple source nodes to multiple target nodes, and those skilled in the art may perform concrete operation steps on the basis of the principle of the present invention.

In step S620, with respect to a current source data block of at least one source data block contained in the source volume, a target data block corresponding to the current source data block is searched for in the target node. In this embodiment, processing may be performed to each source data block contained in the source volume so as to search in a target volume for target data blocks corresponding to each source data blocks (i.e., comprising the same data).

In step S630, the initial copy is updated using the target data block. The initial copy may be updated using the found target data block that corresponds to the source data block. It is appreciated that, after synchronization with the source volume in the source node, when the target node and the source node are no longer in a synchronization relationship, data in the target node might subject to multiple write operations, so part of data in the target node might be covered and further only target data blocks corresponding to part of source data blocks can be found in the target node. Therefore, regarding source data blocks whose corresponding data blocks do not exist in the target node, an additional copy step is further needed so as to copy these source data blocks to the target node.

Next in step S640, judgment is made as to whether or not there exist more source data blocks in the source volume; if yes, the operational flow returns to step S620 so as to perform processing to the next source data block.

In the application environment of the present invention, there may exist two patterns of replication requests: in a first pattern it may be only specified that a source volume is to be replicated from the source node to the target node, but it is not specified where the source volume is to be replicated in the target node; in a second pattern it may be specified a source volume is to be replicated from the source node to the target node and further it may be specified where the source volume is to be replicated in the target node. Therefore, different processing may be performed with respect to replication requests in the two patterns.

In the first pattern, if the found target data block is a free data block, then the free data block may directly be used as the target data block; if the found target data block is not free but occupied by another application, then a snapshot of the target data block needs to be generated. Specifically, in one embodiment of the present invention, there is further comprised: in response to the target data block being occupied, identifying a snapshot of the target data block as the target data block. If the found target data block is a free data block, then the initial copy may be updated using the target data block directly.

It is appreciated that, since the target node may further be applied for other usage, the found target data block might be occupied by another application. At this point, a snapshot of the target data block needs further to be obtained and is used as the target data block. It is appreciated that, compared with transmitting the source data block from the source node to the target node, the time spent on obtaining the snapshot of the target data block is negligible. Therefore, the time spent on preparing the initial copy may be greatly reduced using the technical solution of the present invention.

In the second pattern, since the source data block in the source volume needs to be replicated to a specified location (target volume) in the target node, an additional operation is needed so as to ensure that the final target data block is in the target volume. Specifically, in one embodiment of the present invention, there is further comprised: in response to the request indicating the source volume is to be replicated to a target volume of the target node, if the target data block is not in the target volume, generating a snapshot of the target data block in the target volume and identifying the snapshot as the target data block.

In this manner, when the target data block is located in the target volume, the initial copy may be updated directly on the basis of the target data block; when the target data block is not in the target volume, a snapshot of the target data block may be generated in the target volume and is used as the final target data block to update the initial copy.

In one embodiment of the present invention, the generating a snapshot of the target data block in the target volume comprises: obtaining a current address of the current source data block in the source volume; and generating a snapshot of the target data block at an address, in the target volume, corresponding to the current address.

It is appreciated that, since target data blocks in the initial copy must correspond to source data blocks in the source volume, it should be ensured that addresses of the target data blocks correspond to addresses of the source data blocks. In this embodiment, supposing a current address of the current source data block in the source volume is add-block1, a snapshot of the target data block may be generated at an address in the target volume which corresponds to add-block1. In other words, the address offset between the snapshot and the target volume and the address offset between the current source data block and the source volume are the same. By this means, it may be ensured that addresses of the target data blocks in the initial copy correspond to addresses of the source data blocks in the source volume one by one.

In one embodiment of the present invention, the searching in the target node for a target data block corresponding to the current source data block comprises: obtaining a list being associated with the current source data block and comprising one or more candidate target data blocks, the candidate target data block being a target data block in the target node which has a historical copy relationship with the current source data block; and identifying the candidate data block as the target data block in response to the candidate target data block matching the current source data block.

In historical copy from the source node to the target node, a historical copy list may record where various source data blocks in the source node are copied to the target node, so that when generating the initial copy, candidate target data blocks in a historical copy list are searched for as a priority on the basis of historical copy relationships in the list. Specifically, supposing in historical copy a source data block A1 in the source volume of the source node is replicated to the target node to form a target data block B1, a historical copy list may be as shown in Table 1 below.

TABLE 1

Example 1 of Historical Copy List

| Source Data Block | Target Data Block |
|---|---|
| A1 | B1 |
| ... | ... |

When the source data block A1 is copied to the target node for several times (for example, further forms target data blocks C1 and C2) and the target data block B1 is further copied in the target node (for example, forms D1), a historical copy list may be as shown in Table 2 below.

TABLE 2

Example 2 of Historical Copy List

| Source Data Block | Target Data Block |
|---|---|
| A1 | B1, C1, C2, D1 |
| ... | ... |

It is appreciated that, target data blocks in the historical copy list may be one or more target data blocks having a direct or indirect copy relationship with the source data block. Although Table 1 and Table 2 only illustrate a copy history associated with one source data block A1, those skilled in the art may understand the historical copy list may comprise the copy history associated with a plurality of source data blocks.

In one embodiment of the present invention, a target data block corresponding to each source data block in the source volume may be looked up in the target node on the basis of the historical copy list, rather than the entire target node being searched. Specifically, when receiving a request to generate an initial copy of the source volume, for example, regarding a source data block A1 comprised in the source volume, a target data block corresponding to the current source data block A1 may be searched for in the target node on the basis of the historical copy list shown in Table 2. For example, when it is found a data block B1 in the target node matches the source data block A1, the search may stop and B1 is taken as the target data block. Since data blocks in the target node might be modified by other application, B1 might no longer match A1. When it is found the data block B1 no longer matches the source data block A1, other data blocks (e.g., data blocks C1, C2 and D1) in the list may further be checked, until a target data block matching the source data block A1 is found or all data blocks in the list are traversed.

To further reduce the computation load involved in search, judgment as to whether two data block are matched may further be made by comparing a label of the source data block with a label of the target data block, instead of comparing the source data block with the target data block. For the sake of simplicity, the label of the data block may be formed on the basis of a timestamp of data within the data block.

In one embodiment of the present invention, the identifying the candidate data block as the target data block in response to the candidate target data block matching the current source data block comprises: in response to a label of the candidate target data block matching a label of the current source data block, identifying the candidate target data block as the target data block, wherein the label of the current source data block comprises an identifier of the current source data block and a timestamp of data in the current source data block, the label of the candidate target data block being the same as a label of a source data block that has the historical copy relationship with the candidate target data block.

Figure 7:
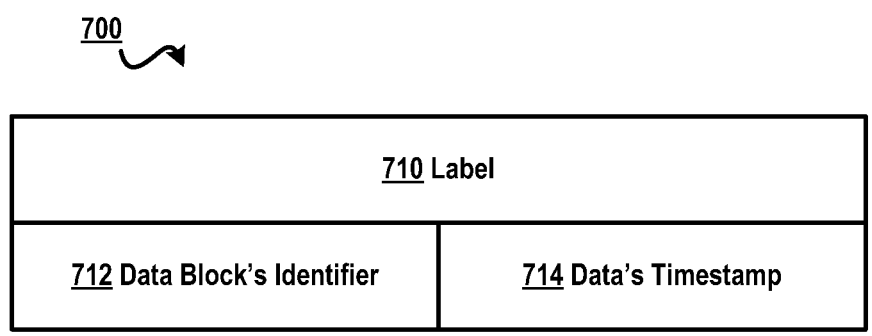
FIG. 7 schematically depicts a block diagram of the structure of a label of a data block according to one embodiment of the present invention.

FIG. 7 schematically shows a block diagram 700 of a structure of a label of a data block according to one embodiment of the present invention. A label 710 may comprise an identifier 712 of a data block and a timestamp 714 of data. It is appreciated that, those skilled in the art may customize the precision of the timestamp, and by increasing the precision of the timestamp, a unique label may be generated for each data block in the source volume.

In one embodiment of the present invention, the label of the source data label may comprise an identifier of the current source data block and a timestamp of data in the current source data block. For example, an identifier of the source data block A1 may be A1, while a timestamp of data stored therein may be 20140101000000, at which point the label of the source data block A1 may be A1-20140101000000. A label of the candidate target data block is the same as a label of a source data block that has a historical copy relationship with the candidate target data block. Therefore, in the target node, the label of the target data block B1 formed by copying the source data block A1 may also be A1-20140101000000. It is appreciated that, only the example of the data structure of the label is illustrated in the context of the present invention, and those skilled in the art may further adopt other data structure, for example, recording timestamps with higher precision.

In one embodiment of the present invention, when the data in the current source data block is modified, the label of the current source data block is updated on the basis of a timestamp of the modified data. For example, when data in the source data block A1 is modified at 00:00:00 on Jan. 2, 2014, the label of the source data block A1 may be modified as A1-20140102000000. It is appreciated that, since content of the source data block A1 is changed, the source data block A1 no longer matches the target data block B1. At this point, the label of the target data block B1 remains unchanged. Therefore, by modifying the label of the source data block A1, it may be ensured that when, it is found, from comparing labels of A1 and B1, that the two labels are no longer matched, it is determined the candidate target data block B1 does not correspond to the source data block A1.

In one embodiment of the present invention, there is further comprised: deleting the candidate target data block from the list in response to any of: the label of the candidate target data block not matching the label of the current source data block, and the candidate target data block being modified. Therefore, when any of the source data block and the candidate target data block is modified, a correspondence relationship between the source data block and the candidate target data block is no longer established, so the source data block and the candidate target data block that no longer have a correspondence relationship may be deleted from the list.

Figure 8A:
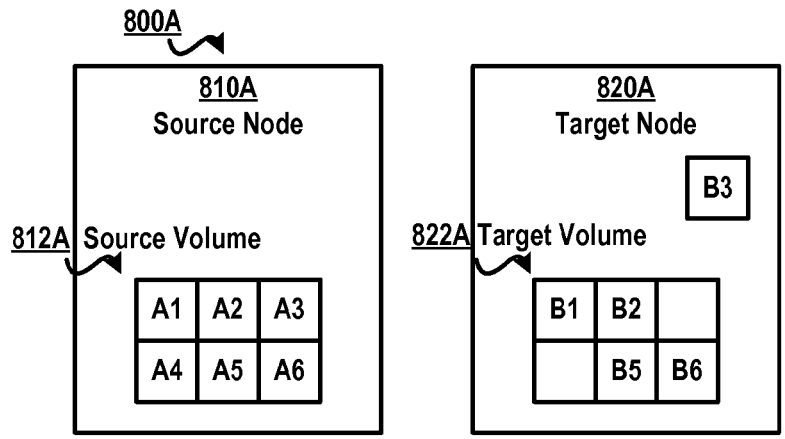
FIGS. 8A to 8C schematically depict diagrams of technical solutions for generating an initial copy in data initialization according to one embodiment of the present invention.
Figure 8B:
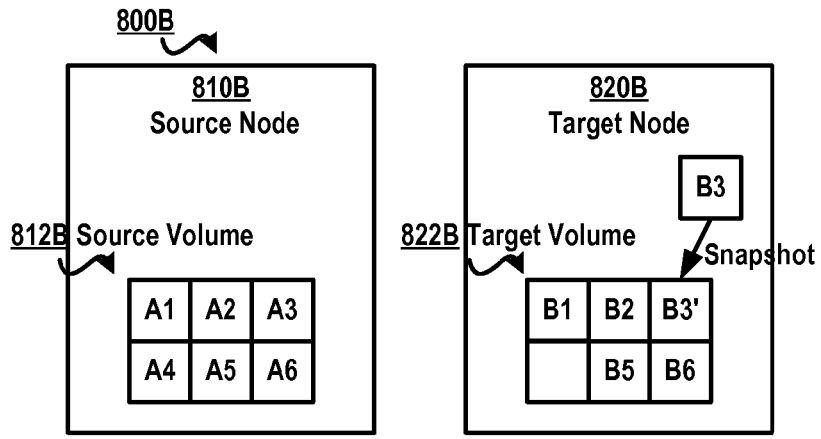
Figure 8C:
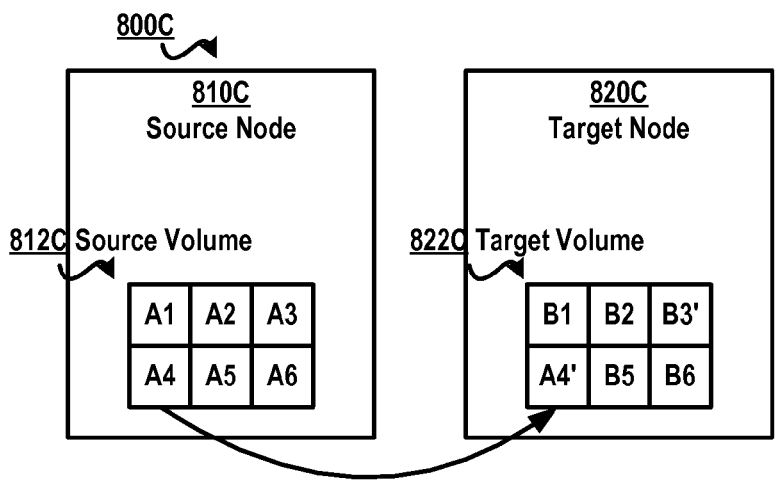

FIGS. 8A to 8C schematically show diagrams 800A to 800C of technical solutions for generating an initial copy in data initialization according to one embodiment of the present invention. In this embodiment, it is desired to replicate a source volume 812A in a source node 810A to a target volume 822A in a target node 820A. With the above technical solution, target data blocks B1, B2, B3, B5 and B6 having a correspondence relationship with source volume 812A in source node 810A have been found in target node 820A. In this embodiment, the found target data blocks B1, B2, B5 and B6 are located inside target volume 822A, whereas the target data block B3 is located outside target volume 822A. Therefore, a snapshot of the target data block B3 needs to be generated inside target volume 822A; in addition, since in target node 820A there is no target data block corresponding to a source data block A4, the source data block A4 needs to be copied from source node 810A.

FIG. 8B schematically shows a block diagram 800B of a technical solution for generating a snapshot of a target data block inside a target volume according to one embodiment of the present invention. In this embodiment, the target data block B3 corresponds to a source data block A3, a snapshot B3' of the target data block B3 may be generated inside a target volume 822B in target node 820B. In this embodiment, the address of the snapshot B3 in target volume 822B corresponds to the address of the source data block A3 in source volume 812B in source node 810B.

It is appreciated that, with the method according to the embodiments described above, previously copied data blocks that exist in the target node may be reused as much as possible, so as to reduce the data amount to be transmitted during the initial copy generation. When the target node and the source node are no longer in a synchronization relationship, the target node may further be for other usage and in turn data in the target node may be modified by other application. Usually, target data blocks corresponding to only one part of source data blocks in the source volume of the source node can be found in the target node. Regarding source data blocks for which corresponding target data blocks cannot be found in the target node, these source data blocks need to be further transmitted from the source node to the target node.

In one embodiment of the present invention, there is further comprised: selecting from the source volume source data blocks other than the source data block corresponding to the target data block in the initial copy, so as to form a source data block set; and copying a source data block in the source data block set from the source node to the target node so as to update the initial copy.

As shown in FIG. 8B, in target node 820B there is no target data block corresponding to the source data block A4, so the source data block A4 needs to be copied from the source node to the target node. It is appreciated that, although the embodiment in FIG. 8B shows a circumstance where the target node do not contain only one target data block (i.e., the source data block set only comprises one source data block A4), those skilled in the art should understand the source data block set may comprise a plurality of source data blocks.

Since the address of the target data block in the initial copy has a correspondence relationship with the address of the source data block in the source volume, the address correspondence relationship should be considered when copying the source data block from the source node to the target node. Specifically, in one embodiment of the present invention, the copying a source data block in the source data block set from the source node to the target node so as to update the initial copy comprises: with respect to each source data block in the source data block set, obtaining an address of the source data block in the source volume; and copying the source data block to an address, in the target volume, corresponding to the address, so as to update the initial copy.

FIG. 8C schematically shows a diagram 800C of copying a source data block A4 from a source node 810C to a target node 820C. As shown by an arrow in FIG. 800C, the source data block A4 is copied to a corresponding address in a target volume 822C of target node 820C so as to form a target data block A4', wherein an address of the target data block A4' in target volume 822C corresponds to an address of the source data block A4 in a source volume 812C'. By means of the technical solutions as shown in FIGS. 8A to 8C, the target volume of the target node comprises all data within the source volume.

As detailed steps (in the first pattern) of the technical solution for generating an initial copy in a target volume of a target node have been described above with reference to FIGS. 8A to 8C, those skilled in the art may implement a technical solution for generating an initial copy at other location in the target node on the basis of the above principle. Specifically, on the basis of the address correspondence relationship between target data blocks in the initial copy and source data blocks in the source volume, the target data blocks in the initial copy are assembled so as to form the final initial copy.

As the principle of the present invention has been described above in various embodiments, those skilled in the art should understand the embodiments of the present application are especially applicable to the circumstance where the target node is once synchronized with the source node. At this point, there might exist in the target node a large amount of target data blocks having a correspondence relationship with source data blocks in the source node. Although target data blocks are scattered in the target node, according to the technical solution of the embodiments of the present invention, only snapshots of these target data blocks need to be generated at appropriate locations in the target node. Thereby, only part of source data blocks need to be copied from the source node, and the initial copy may be rapidly generated by assembling these snapshots and copied data blocks.

In addition, the embodiments of the present invention require a quite small additional computation load, so the additional computation load may be ignored over the data transmission operation that costs several hours and even days in the prior art. Even if there is no target data block in the target node which corresponds to the source data block, the search step of the present invention will not produce too much overheads.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 9:
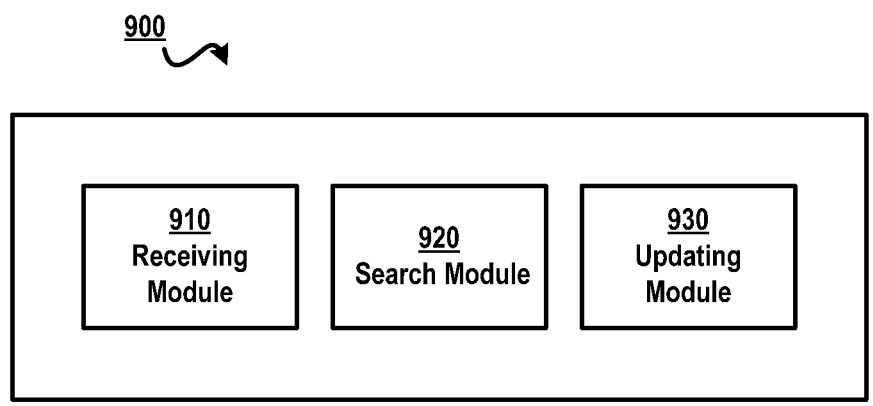
FIG. 9 schematically depicts a block diagram of an apparatus for generating an initial copy in data initialization according to one embodiment of the present invention.

FIG. 9 schematically shows a block diagram 900 of an apparatus for generating an initial copy in data initialization according to one embodiment of the present invention. Specifically, there is provided an apparatus for generating an initial copy in replication initialization, comprising: a receiving module 910 configured to receive a request to replicate a source volume from a source node to a target node so as to generate the initial copy of the source volume; a search module 920 configured to, with respect to a current source data block of at least one source data block contained in the source volume, search in the target node for a target data block corresponding to the current source data block; and an updating module 930 configured to update the initial copy using the target data block.

In one embodiment of the present invention, there is further comprised: a first identifying module configured to, in response to the target data block being occupied, identify a snapshot of the target data block as the target data block.

In one embodiment of the present invention, there is further comprised: a second identifying module configured to, in response to the request indicating the source volume is to be replicated to a target volume of the target node, if the target data block is not in the target volume, generate a snapshot of the target data block in the target volume and identify the snapshot as the target data block.

In one embodiment of the present invention, the second identifying module comprises: an address obtaining module configured to obtain a current address of the current source data block in the source volume; and a snapshot generating module configured to generate a snapshot of the target data block at an address, in the target volume, corresponding to the current address.

In one embodiment of the present invention, search module 920 comprises: a list obtaining module configured to obtain a list being associated with the current source data block and comprising one or more candidate target data blocks, the candidate target data block being a target data block in the target node which has a historical copy relationship with the current source data block; and a third identifying module configured to identify the candidate data block as the target data block in response to the candidate target data block matching the current source data block.

In one embodiment of the present invention, the third identifying module comprises: a fourth identifying module configured to, in response to a label of the candidate target data block matching a label of the current source data block, identify the candidate target data block as the target data block, wherein the label of the current source data block comprises an identifier of the current source data block and a timestamp of data in the current source data block, the label of the candidate target data block being the same as a label of a source data block that has the historical copy relationship with the candidate target data block.

In one embodiment of the present invention, when the data in the current source data block is modified, the label of the current source data block is updated on the basis of a timestamp of the modified data.

In one embodiment of the present invention, there is further comprised: a deleting module configured to delete the candidate target data block from the list in response to any of: the label of the candidate target data block not matching the label of the current source data block, and the candidate target data block being modified.

In one embodiment of the present invention, there are further comprised: a set forming module configured to select from the source volume source data blocks other than the source data block corresponding to the target data block in the initial copy, so as to form a source data block set; and a copy module configured to copying source data blocks in the source data block set from the source node to the target node so as to update the initial copy.

Specifically, in one embodiment of the present invention, the copying module comprises: a second address obtaining module configured to, with respect to each source data block in the source data block set, obtain an address of the source data block in the source volume; and a second copying module configured to copy the source data block to an address, in the target volume, corresponding to the address, so as to update the initial copy.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating an initial copy in replication initialization, comprising:
receiving a request to replicate a source volume from a source node to a target volume in a target node so as to generate the initial copy of the source volume in the target volume in the target node; and for each source data block in a set of source data blocks contained in the source volume, with respect to a current source data block of the set of source data blocks contained in the source volume:

searching in the target node for a target data block corresponding to the current source data block;

responsive to identifying the target data block in the target volume in the target node, updating the initial copy of the source volume in the target node using the target data block with information from the current source data block;

responsive to the target data block failing to be in the target volume but in the target node, generating a snapshot of the target data block from a current location in the target node in the target volume, identifying the snapshot as the target data block, and updating the initial copy of the source volume in the target node using the snapshot with information from the current source data block; and responsive to the target data block failing to be in the target node, copying the current source data block from the source volume in the source node to the target volume in the target node thereby updating the initial copy.

2. The method according to claim 1, further comprising:
in response to the target data block being occupied, identifying a snapshot of the target data block as the target data block.

3. The method according to claim 1, wherein generating the snapshot of the target data block from the current location in the target node in the target volume comprises:
obtaining a current address of the current source data block in the source volume; and
generating the snapshot of the target data block at an address, in the target volume, corresponding to the current address of the current source data block in the source volume.

4. The method according to claim 1, wherein searching in the target node for the target data block corresponding to the current source data block comprises:
obtaining a list being associated with the current source data block and comprising one or more candidate target data blocks, each candidate target data block being a target data block in the target node which has a historical copy relationship with the current source data block; and
identifying the candidate target data block as the target data block in response to the candidate target data block matching the current source data block.

5. The method according to claim 4, wherein identifying the candidate target data block as the target data block in response to the candidate target data block matching the current source data block comprises:
in response to a label of the candidate target data block matching a label of the current source data block, identifying the candidate target data block as the target data block, wherein the label of the current source data block comprises an identifier of the current source data block and a timestamp of data in the current source data block, and wherein a label of the candidate target data block being the same as the label of the current source data block that has the historical copy relationship with the candidate target data block.

6. The method according to claim 5, wherein, when the data in the current source data block is modified, the label of the current source data block is updated on the basis of a timestamp of the modified data.

7. The method according to claim 5, further comprising:
deleting the candidate target data block from the list in response to any one of: the label of the candidate target data block not matching the label of the current source data block, or the candidate target data block being modified.

8. The method according to claim 1, wherein copying the current source data block from the source volume in the source node to the target volume in the target node so as to update the initial copy comprises:
obtaining an address of the current source data block in the source volume; and
copying the current source data block to an address, in the target volume, corresponding to the address of the source data block in the source volume, so as to update the initial copy.

9. An apparatus for generating an initial copy in replication initialization, comprising:
a processing device; and
a memory coupled to the processing device, wherein the memory comprises instructions which, when executed by the processing device, cause the processing device to:
receive a request to replicate a source volume from a source node to a target volume in a target node so as to generate the initial copy of the source volume in the target volume in the target node; and
for each source data block in a set of source data blocks contained in the source volume, with respect to a current source data block of the set of source data blocks contained in the source volume:
search in the target node for a target data block corresponding to the current source data block;
responsive to identifying the target data block in the target volume in the target node, update the initial copy of the source volume in the target node using the target data block with information from the current source data block;
responsive to the target data block failing to be in the target volume but in the target node, generate a snapshot of the target data block from a current location in the target node in the target volume, identify the snapshot as the target data block, and update the initial copy of the source volume in the target node using the snapshot with information from the current source data block; and
responsive to the target data block failing to be in the target node, copy the current source data block from the source volume in the source node to the target volume in the target node thereby updating the initial copy.

10. The apparatus according to claim 9, wherein the instructions further-cause the processing device to:
in response to the target data block being occupied, identify a snapshot of the target data block as the target data block.

11. The apparatus according to claim 9, wherein the instructions to generate the snapshot of the target data block from the current location in the target node in the target volume further causes the processing device to:
obtain a current address of the current source data block in the source volume; and generate the snapshot of the target data block at an address, in the target volume, corresponding to the current address of the current source data block in the source volume.

12. The apparatus according to claim 9, wherein the instructions to search in the target node for the target data block corresponding to the current source data block further causes the processing device to:
obtain a list being associated with the current source data block and comprising one or more candidate target data blocks, each candidate target data block being a target data block in the target node which has a historical copy relationship with the current source data block; and
identify the candidate data block as the target data block in response to the candidate target data block matching the current source data block.

13. The apparatus according to claim 12, wherein the instructions to identify the candidate target data block as the target data block in response to the candidate target data block matching the current source data block further causes the processing device to:
in response to a label of the candidate target data block matching a label of the current source data block, identify the candidate target data block as the target data block, wherein the label of the current source data block comprises an identifier of the current source data block and a timestamp of data in the current source data block, and wherein a label of the candidate target data block being the same as the label of the current source data block that has the historical copy relationship with the candidate target data block.

14. The apparatus according to claim 13, wherein the instructions further-cause the processing device to:
delete the candidate target data block from the list in response to any one of: the label of the candidate target data block not matching the label of the current source data block, or the candidate target data block being modified.

15. The apparatus according to claim 9, wherein the instructions to copy the current source data block from the source volume in the source node to the target volume in the target node so as to update the initial copy further causes the processing device to:
obtain an address of the current source data block in the source volume; and
copy the current source data block to an address, in the target volume, corresponding to the address of the source data block in the source volume, so as to update the initial copy.

16. A computer program product comprising a computer readable storage medium having a computer readable program stored therein, wherein the computer readable program, when executed on a computing device, causes the computing device to:
receive a request to replicate a source volume from a source node to a target volume in a target node so as to generate the initial copy of the source volume in the target volume in the target node; and
for each source data block in a set of source data blocks contained in the source volume, with respect to a current source data block of the set of source data blocks contained in the source volume:
search in the target node for a target data block corresponding to the current source data block;
responsive to identifying the target data block in the target volume in the target node, update the initial copy of the source volume in the target node using the target data block with information from the current source data block;
responsive to the target data block failing to be in the target volume but in the target node, generate a snapshot of the target data block from a current location in the target node in the target volume, identify the snapshot as the target data block, and update the initial copy of the source volume in the target node using the snapshot with information from the current source data block; and
responsive to the target data block failing to be in the target node, copy the current source data block from the source volume in the source node to the tar et volume in the target node thereby updating the initial copy.

17. The computer program product according to claim 16, wherein the computer readable program to generate the snapshot of the target data block from the current location in the target node in the target volume further causes the computing device to:
obtain a current address of the current source data block in the source volume; and
generate the snapshot of the target data block at an address, in the target volume, corresponding to the current address of the current source data block in the source volume.

18. The computer program product according to claim 16, wherein the computer readable program to search in the target node for the target data block corresponding to the current source data block further causes the computing device to:
obtain a list being associated with the current source data block and comprising one or more candidate target data blocks, each candidate target data block being a target data block in the target node which has a historical copy relationship with the current source data block; and
identify the candidate data block as the target data block in response to the candidate target data block matching the current source data block.

19. The computer program product according to claim 18, wherein the computer readable program to identify the candidate target data block as the target data block in response to the candidate target data block matching the current source data block further causes the computing device to:
in response to a label of the candidate target data block matching a label of the current source data block, identify the candidate target data block as the target data block, wherein the label of the current source data block comprises an identifier of the current source data block and a timestamp of data in the current source data block, and wherein a label of the candidate target data block being the same as the label of the current source data block that has the historical copy relationship with the candidate target data block.

20. The computer program product according to claim 16, wherein the computer readable program to copy the current source data block from the source volume in the source node to the target volume in the target node so as to update the initial copy further causes the computing device to:
obtain an address of the current source data block in the source volume; and
copy the current source data block to an address, in the target volume, corresponding to the address of the source data block in the source volume, so as to update the initial copy.

* * * * *